UNITED STATES PATENT OFFICE.

JOHN H. WHEELER, OF MACY, ASSIGNOR OF ONE-HALF TO R. W. CARR, OF BRAZOS COUNTY, TEXAS.

INSECTICIDE.

SPECIFICATION forming part of Letters Patent No. 260,916, dated July 11, 1882.

Application filed December 28, 1881. (No specimens.)

*To all whom it may concern:*

Be it known that I, JOHN H. WHEELER, a citizen of the United States, residing at Macy, in the county of Brazos and State of Texas, have invented certain new and useful Improvements in Compounds for Destroying Weevils, Rats, Mice, &c.; and I do declare the following to be a full, clear, and exact description of the invention, such as will enable others skilled in the art to which it appertains to make and use the same.

My composition consists of the following ingredients, combined in the proportions stated, viz: flowers of sulphur, three-quarters of a pound; ground sassafras-bark, one-half pound; ground Cayenne pepper, one-quarter pound, the whole being mixed with sufficient water to form a thin paste.

In using the above-named composition, which is sufficient for treating three hundred bushels of corn, the paste is spread upon cotton rags or other waste and burned in a furnace the pipe of which connects with a perforated pipe arranged within the central part of the corn-crib, the top of the said perforated pipe being closed. The smoke or fumes from the burning composition passes from the furnace up into the perforated pipe and through the perforations of the same into the corn in the crib, serving to expel or destroy the weevils, insects, or other vermin finding lodgment therein.

By means of my composition a great loss of corn by weevils, rats, or mice is prevented, it having been found by actual observation that the yearly destruction of corn by vermin amounts to at least one-third of the crop stowed away in the crib or bin.

Having thus described my invention, what I claim as new and useful is—

The herein-described composition of matter for destroying weevils, rats, or mice in corn-cribs, the same consisting of flowers of sulphur, ground sassafras-bark, and ground Cayenne pepper, mixed with water in the proportions specified, to form a thin paste.

December 20, 1881.

JOHN H. WHEELER.

Witnesses:
HUGH REED,
JAMES K. DERDEN.